2 Sheets--Sheet 1.

N. PORTER.
Apparatus for Drying Tan.

No. 145,010.           Patented Nov. 25, 1873.

N. PORTER.
Apparatus for Drying Tan.
No. 145,010.    Patented Nov. 25, 1873.
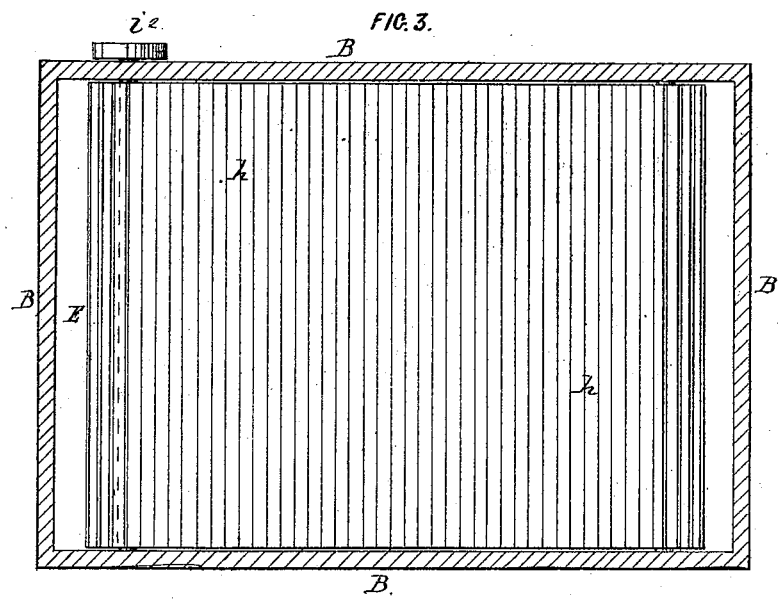
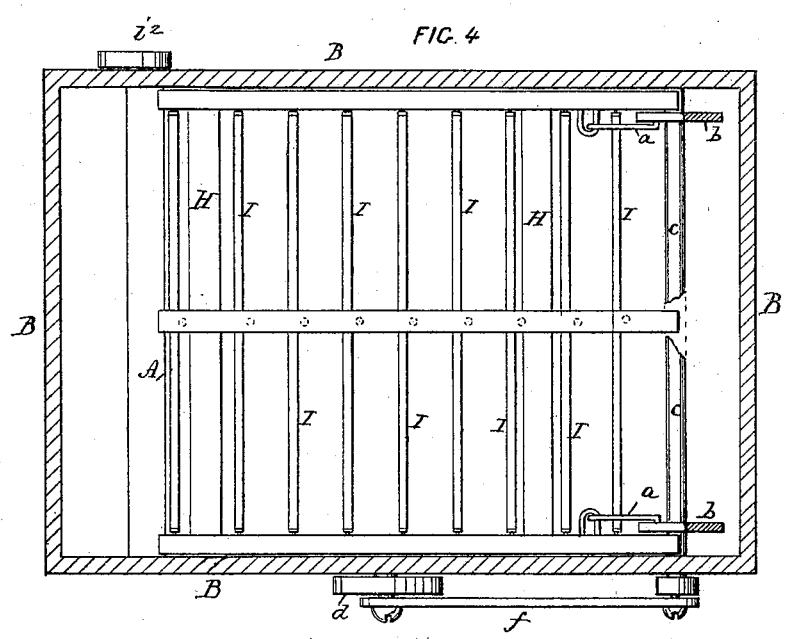

UNITED STATES PATENT OFFICE.

NATHANIEL PORTER, OF PEABODY, MASSACHUSETTS.

IMPROVEMENT IN APPARATUS FOR DRYING TAN.

Specification forming part of Letters Patent No. 145,010, dated November 25, 1873; application filed September 4, 1873.

*To all whom it may concern:*

Be it known that I, NATHANIEL PORTER, of Peabody, State of Massachusetts, have invented an Improved Apparatus for Drying Tan, &c., of which the following is a specification:

This invention relates to an apparatus more especially for drying tan, but it is susceptible of use for drying other materials, as will be obvious from the description hereinafter given of the same. The invention consists of certain improvements which are fully hereinafter described and claimed.

Figure 1:
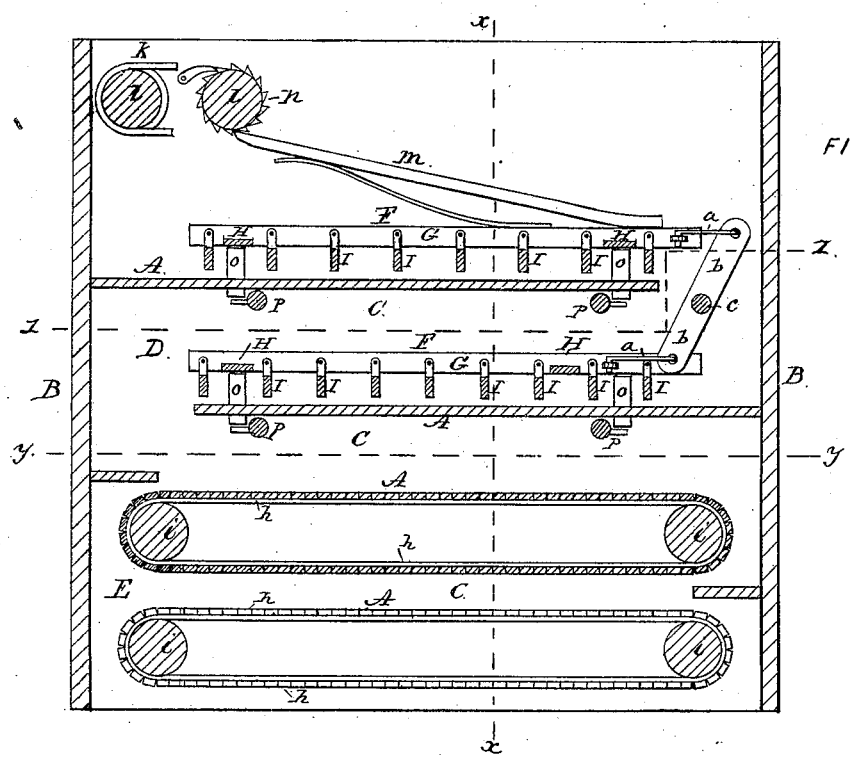
Figure 2:
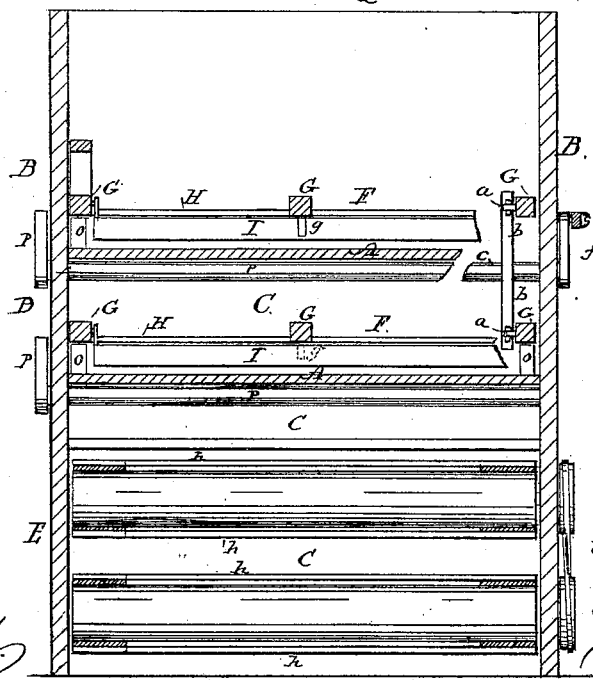

In the accompanying plates of drawings my improved apparatus for drying tan is illustrated, Figure 1, Plate 1, being a central vertical section from end to end of the same; Fig. 2, Plate 1, a transverse vertical section in plane of line $x\,x$, Fig. 1; Fig. 3, Plate 2, a horizontal section in plane of line $y\,y$, Fig. 1; and Fig. 4, Plate 2, a horizontal section in plane of line $z\,z$, Fig. 1.

A A in the drawings represent a series of floors. These floors A A are arranged within an upright casing, B, one above another, with an intervening space, C; and the casing B incloses the series upon all sides, except top and bottom, which are open, as shown. The floors A, at one end, are open, bringing the spaces C between the several floors into communication with each other, the open end of one floor being at the opposite end to the open end of the floor next above or next below, thus making a continuous zigzag channel or space between the several floors from the lower to the upper floor of the series. For each stationary floor D a similar scraper, F, is provided. Each scraper F is constructed of a frame, G, that is braced with cross-bars H, and is provided with swinging scrapers I. These scrapers I are disposed across the length of the scraper-frame G; and the frame G, as a whole, is arranged within the casing along the length of the floors, (one scraper-frame to each stationary floor,) to be moved horizontally and in a direction from end to end of the floor. The scraper-frame G, at one end, is connected by links $a$ with arms $b$ of a horizontal shaft, $c$. The shaft $c$ is arranged transversely within the casing B, and outside of the casing it is connected to a shaft, $d$, through mechanism such as shown at $f$, so that, by a continuous rotation of the shaft $d$, the shaft $c$, to which the scraper is connected, is rocked forward and backward, carrying thereby the scraper along the length of the floor toward the open end thereof, and then backward therefrom, upon each complete turn of the said shaft. In the forward movement of the scraper-frame, whatever material may be upon the floor is carried along by it toward the open end; and, in the backward movement of the scraper-frame, the material is left in the position to which it had been advanced by the previous forward movement, to be again carried along on the next forward movement of the scraper-frame, and so on until, reaching the open end of the floor, it is discharged to the floor next below. Under the forward movement of the scraper-frame the scrapers are, by abutment against the pins $g$ of the frame, held to the work; whereas, under the backward movement they are free to swing out of action, thus leaving the material on the floor substantially undisturbed. The traveling floors E are constructed of endless aprons $h$, passing around a shaft, $i$, at each end, which are suitably driven to cause the aprons to travel continuously toward the open end of the floor. The endless aprons $h$ are shown at $i^2$ as driven by pulley and belt; and, in the illustration of my apparatus, four floors are shown, two being fixed and two traveling. K, an apron arranged above the closed end of the uppermost floor of the series of floors. This apron passes around a roller, $l$, at each end, and is the feed-apron to the apparatus. It is driven by the backward movement of the upper scraper-frame G, which, for such purpose, carries a spring-pawl, $m$, to engage with the teeth of a ratchet-wheel, $n$, located at one end of one of the apron-rollers $l$; $o$, blocks on which the scraper-frames rest in their forward-and-backward movement. These blocks $o$, in lieu of being fixed, are arranged to be adjusted, as to height from the floor, so as to bring the scrapers into a plane of action more or less above the floor. The lifting of the blocks is secured through the handle-levers $p$ applied thereto, as shown.

The lower end of the apparatus, constructed as above described, is to be connected with any suitable apparatus for generating hot air, and thus the heated air, entering the apparatus at the bottom, circulates through the same from one floor to another, finally escaping at the top or upper floor. With heated air thus passing through the spaces between the series of floors, and the material to be dried then fed from the feed-apron K above the upper floor, and the several floors, if adapted to travel, driven, or, if the floors be stationary and scrapers employed, the scrapers driven, obviously the material—as, for instance, tan—will be fed along each floor in succession in an opposite direction to that in which the heated air is traveling, and thus, obviously, being subjected to the heated air finally before it escapes at the lower floor, can and will be dried to a greater or lesser extent, and thoroughly so, under a proper degree of heat, or under a proper relative degree of heat and speed of movement of the material through the apparatus.

I do not claim here the traveling floors E, as they may form the subject of a separate application for Letters Patent.

Having thus described my invention, what I claim, and desire to secure by Letters Patent, is—

The stationary solid floors A, arranged as herein described, in combination with the reciprocating scrapers, links $a$ $b$, and shaft $c$, all constructed and arranged substantially as described, for the purpose specified.

The above specification of my invention signed by me this 5th day of July, A. D. 1873.

N. PORTER.

Witnesses:
EDWIN W. BROWN,
J. P. McELROY.